(12) United States Patent
Fulmer et al.

(10) Patent No.: US 6,498,321 B1
(45) Date of Patent: Dec. 24, 2002

(54) SYSTEM AND METHOD FOR CONTROLLING AN ELECTRIC ARC WELDER

(75) Inventors: Bruce E. Fulmer, Mentor, OH (US); Steven R. Peters, Huntsburg, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 24 days.

(21) Appl. No.: 09/828,090

(22) Filed: Apr. 9, 2001

(51) Int. Cl.[7] .............................................. B23K 9/10
(52) U.S. Cl. ............................ 219/130.33; 219/137 PS; 219/137.71
(58) Field of Search ...................... 219/137 PS, 130.33, 219/130.51, 130.31, 130.32, 137.71

(56) References Cited

U.S. PATENT DOCUMENTS

| | | | | |
|---|---|---|---|---|
| 3,728,516 A | * | 4/1973 | Daspit ................... | 219/130.33 |
| 3,895,212 A | * | 7/1975 | Maxwell et al. ....... | 219/130.33 |
| 4,000,374 A | * | 12/1976 | Keyser .................. | 219/130.33 |
| 4,721,843 A | * | 1/1988 | Budai et al. ........... | 219/137 PS |
| 4,794,232 A | * | 12/1988 | Kimbrough et al. ... | 219/130.33 |
| 4,866,247 A | * | 9/1989 | Parks et al. ............ | 219/137 PS |

FOREIGN PATENT DOCUMENTS

| FR | 248647 | * | 10/1981 | ............. | 219/130.33 |
|---|---|---|---|---|---|

* cited by examiner

*Primary Examiner*—Clifford C. Shaw
(74) *Attorney, Agent, or Firm*—Fay, Sharpe, Fagan, Minnich & McKee (57) ABSTRACT

A control system for an electric arc welder performing a welding process between an electrode and a workpiece, which system comprises: a high speed switching type power supply with a controller operated at a switching frequency of at least about 10 kHz with an input current control signal to adjust the output current of the power supply; a first sensor sensing the actual arc voltage; a second sensor sensing the actual arc current; a first circuit for creating a power signal representing the desired real time power level at progressive times during the welding process; a second circuit for creating a function of the sensed actual voltage and the sensed actual current; and a third circuit for adjusting the current control signal in accordance with the difference between the power signal and the function of the actual voltage and current, preferably arc power.

26 Claims, 11 Drawing Sheets

SYSTEM AND METHOD FOR CONTROLLING AN ELECTRIC ARC WELDER

The present invention relates to the art of electric arc welding and more particularly to an improved system and method for controlling the power supply during a welding process.

BACKGROUND OF INVENTION

In electric arc welding it is common to employ a high speed switching type power supply, such as an inverter or chopper, so the output current of the power supply can be adjusted by a high speed control loop involving current feedback. In such electric arc welders, there is an outer control loop for creating the current command in accordance with the comparison of the average arc voltage with a reference voltage. In some instances, the current command signal to the power supply is directly controlled by the outer control loop. Consequently, the inner high speed control is based upon current feedback and is adjusted to maintain an average voltage. These inner high speed control loops operate at somewhat close to the speed of the inverter or chopper. The outer voltage control loop operates at about one-tenth the speed of the high speed switching power supply. Furthermore, the outer loop operates without the knowledge of the actual current used in the high speed inner control loop. Consequently, at low current operations, the arc current can dip too low and may cause extinguishing of the arc. Welding of aluminum GMAW requires more accurate control to maintain high weld rates. Thus, controlling the output current of a high speed switching power supply often involves a current overshoot because the outer control loop has a relatively slow reaction time. In short circuit and pulse welding where the feedback is average voltage, a complete weld cycle or portion of a weld cycle must be processed causing a relatively slow response time in the outer control loop. The control loop must be slowed down to maintain an average voltage to adequately compensate for long durations near zero voltage in a short circuit arc welding process. The control loop is thus very slow and the arc length is allowed to vary drastically during the welding process. With such a slow control loop the current is forced to transition by a greater amount to drive the arc length to the desired control voltage set by the outer loop. This presents two problem areas. In short arc welding at low currents, the background current is already so low that swings in the current, as experienced in a constant voltage system, forces the current too low and allow the arc to extinguish. This is especially noticeable just after each short is cleared. As the current is reduced to the background level, the control voltage system may overshoot and force the actual current to be driven too low allowing the arc plasma to be extinguished. This phenomena may occur during each weld cycle of a welding process so that intermittent extinguishing of the arc can be experienced unless corrective, expensive procedures are in place. Thus, welding at low currents is normally quite difficult when operating in short circuiting mode. When welding aluminum, fast changes in stick out or arc length caused by slow control cause intermittent disruption of the welding process with the resultant lack of uniformity of the weld bead.

THE INVENTION

The problems experienced in using a slow outer control loop with or without a high speed inner current control loop, as explained above, have been overcome by the present invention which essentially uses only the inner high speed loop for controlling the welding process. This is made possible by utilizing both the sensed arc current and the sensed arc voltage to produce a feedback signal indicative of the current and voltage product, i.e. power. Essentially, the electric arc welding process, whether it is spray, pulse or AC, has the actual arc power controlled by the desired power. To accomplish this result, both the sensed current and the sensed voltage are used. In the past, the arc voltage controlled the outside loop with its slow response time. The inner high speed loop was merely a current responsive feedback system where a digital error amplifier adjusted the input to the pulse width modulator driving the high speed switching power supply. By utilizing the product of the actual output current and voltage feedback signals, the actual output watts or power is sensed. This signal P is compared to the desired power established by the wave shaper. This causes the output current to change in a manner that forces the actual power to equal the desired power. This is performed at a speed generally ten times as fast as an outer loop control. By using a feedback signal based upon a relationship between both the current and voltage, the arc length is automatically adjusted and the rapid response time prevents any current overshoot.

In accordance with the invention, the voltage and current product is multiplied by a factor k. This product kP is then introduced into the high speed controller for maintaining the arc power at a set amount correlated with the time position in a welding cycle. The slow outer loop control is no longer required. The welding current depends on both the voltage and current introduced into the high speed control loop of the welder. The preferred implementation involves a feedback signal comprising merely the product of arc voltage and arc current. This is the arc power P. This product may be modified by a multiplier k. This factor can be used to compensate for travel speed or wire feed speed. This feedback signal is kP, but k is normally 1.0.

In accordance with a further aspect of the invention, the power P of the arc is a feedback signal for comparison with a power signal or profile from a wave shaper. In this aspect, the wave shaper generates a power profile, especially during arcing conditions of the welding cycle. For instance, when a short circuit type welding is being performed, such as the STT welding process, the wave shaper provides a desired arc power to be created after a short has been broken and an arc is reestablished. When welding in a pulse weld process, the wave shaper outputs peak arc power and then background arc power for comparison with the power feedback signal kP in the high speed control loop. In an AC arc welding process, the desired arc power during the positive polarity is outputted by the wave shaper for comparison with the power feedback signal kP during the actual positive polarity. In a like manner, the desired power during the negative polarity is outputted by the wave shaper for comparison with the power feedback signal kP to control the arc power of the negative polarity. Of course, as used in aluminum welding, the power during the positive polarity can differ drastically from the power during the negative polarity. In summary, a power signal is provided and a power feedback signal kP is sensed. These two parameters are compared to control the current from the high speed switching power supply. Of course, a wave shaper is not necessary during spray or globular welding when a constant power signal $P_{set}$ controls the inner control loop and is used for comparison with the power feedback signal kP from the arc. The present invention results in substantial advantages, primarily at low current welding.

The feedback referred to as the power feedback function or signal kP is a relationship of sensed arc voltage and sensed arc current, which product may be multiplied by a factor k that is a constant or a variable. In the preferred embodiment, the multiplier is a constant 1.0 so that the feedback signal is merely the arc power. This power feedback function or signal is compared to the desired arc power for control of the output current of the power supply. The multiplier k may be a constant, as explained, or a linear equation, non-linear equation, or some other equation. The factor k may depend on the actual voltage or current and is employed to modify the feedback signal in a manner to compensate for various welding parameters, such as wire feed speed, electrode travel speed, shielding gas, wire diameter, wire material, etc. It has been found that multiplier k can be current plus voltage divided by current times voltages to produce a slope of the type in a drooper machine used for stick welding or aluminum MIG welding. This factor k produces a straight line relationship between current and voltage to give a slope operating curve. As can be seen, multiplier k can have any value to produce a specific relationship between voltage and current. However, in practice, the feedback signal is arc power obtained by multiplying the arc current and the arc voltage. This arc power signal is compared with the arc power desired at any given time in the welding cycle. The advantage of controlling power to a set level is based upon the fact that the power can be regulated at the extremely high switching speed of the inverter or chopper. At this high speed, any changes in arc length will result in a change in the arc force that will either increase or decrease the arc length to maintain equilibrium. For instance, when the arc power is set to operate at a given level, such as 2,000 watts, equilibrium is established when the voltage is 20 volts and the current is 100 amperes. This produces the desired arc length. Should the arc length increase, the output power is remained at 2,000 watts. However, the voltage increases, for example such as to 22 volts. This causes the current to drop to a level, such as 91 amperes. The reduced current reduces the arc force and thus causes the arc length to be reduced. This then decreases the voltage back to 20 volts and the current increases to 100 amperes. In a like manner, should the arc length be reduced and become too short, the output power remains at a fixed 2,000 watts. Consequently, the voltage decreases. This causes an immediate high speed increase in the current. Increased current increases the arc force and, thus, tends to force a greater arc length. Consequently, the short arc length is increased and the current and voltage seek equilibrium to produce the 2,000 watt controlled power level. Arc length variations using the present invention are minimized. Rapid stability is maintained. By using the invention, the power supply quickly reacts to changes in arc length so that the current will swing only a minor amount to maintain the desired set arc length. This advantage is especially noticeable immediately after each short is clear. By using the invention, the controller quickly seeks equilibrium of arc length and maintains it, even after the abrupt clearing of a short.

As is well known in aluminum GMAW welding, arc length is more difficult to control due to the low resistivity and melting temperature of the wire. The rapid control of the arc length, as obtained by the present invention, allows the power supply to maintain consistent control over the arc length, even when welding aluminum. Consequently, even with fast changes in stickout, the arc length is consistently maintained.

The invention is applicable to a pulse welding system, as well as a welding process with a constant desired arc power. In a pulse welding implementation of the invention, high speed control of both the peak output power and the background output power is obtained. In the past, pulse welding involved adaptive controls, wherein the arc length was determined by an adaptive loop based upon changing frequency, or a combination of peak current, background current and frequency. Consequently, the feedback control loop operated only once per pulse, whereby calculations were made and corrections were implemented for the next pulse. The present invention overcomes this problem and merely controls the power during peak and the power during background. This is not adaptive. It is real time power control to obtain the advantage of maintaining constant arc length during peak and background portions of the pulse welding cycle. Pulse welding with the present invention causes self regulation of the arc length faster than obtained with conventional adaptive pulse welding controllers. By using power to control low current during the background portion of a pulse wave improves the robustness of the power supply making it more resistant to pop outs.

It has also been found that the present invention is applicable for mixed polarity welding, such as GMAW, FCAW, SAW, MCAW, SMAW and other systems. All of these welding processes can be regulated by the feedback signal kP. For instance, if a square wave AC welding process is desired, a wave shaper provides the desired arc power for the positive polarity and the desired arc power for the negative polarity. High speed regulation during these different power levels quickly controls the arc length during the positive and negative pulses. The magnitude of the positive power may be different than the magnitude of the negative power in accordance with standard welding practice. While the shape and time of the wave form may change, based upon other conditions, the control of the wave form is based upon a power profile, which power profile is compared with the actual power feedback signal kP from the arc to maintain the arc power in accordance with the desired profile. This power profile is outputted by either an analog or, preferably, a digital wave shaper. The wave shaper produces a desired power profile to control the arc power at all portions of the AC welding cycle.

In accordance with the basic aspect of the invention, the feedback signal for the high speed control loop is arc power. This is the product of the sensed arc voltage and the sensed arc current. To modify the feedback signal, the invention also envisions use of a multiplier referred to as factor or multiplier k. The factor k may be a variable amount between 0.5 and 1.0. As indicated before, 1.0 is preferred. As the voltage changes the current control signal to the power supply changes to maintain constant arc power. The use of the factor k provides flexibility to change the relationship between the current and voltage. The use of the factor k does not change the power feature of the feedback signal. Thus, when the feedback "power" signal is referred to in discussing the invention, it is normally the product of current and voltage, i.e. P,; however, it can have a factor multiplier used, i.e. kP. In reality the feedback signal can be referred to as kP with k=1.0 when the signal is actual arc power P. Thus, power is used in the invention and is defined as a control variable which is preferably arc power P expressed as kP. To produce a slope operating characteristic for the feedback signal as explained before, the factor k may be voltage plus current divided by voltage times current. Also, the relationship could be another linear kP such as $av_{arc}+bI_{arc}+c$, where a, b, and c are constants. When this k is multiplied by the product of voltage and current, the feedback signal is the arc voltage plus the arc current. This feedback signal is compared with the desired power signal to obtain the rapid response of the power supply during its switching operation as previously described. The factor k can vary based upon wire feed speed. For instance, the factor k could be 150/wfs. If the wire feed speed is 300 inches/minute, the factor k is 0.5. Thus, the wire feed speed can be used to change the factor k to modify the feedback signal. Factor k may also vary based upon gas or travel speed or the voltage itself. When the factor k is based upon time, the feedback signal is in joules. When voltage is the factor k, the feedback signal is $IV^2$. Other possibilities for modifying the feedback signal involving the product of arc current and arc voltage product can be used, but they do not change the fact that the basic control feedback signal is a multiplication of the current and voltage at the arc. Factor k can be modified by several welding variables or combinations of such variables. Those variables now used are travel speed, wire feed speed, voltage, current, time, gas mix, actual electrode stick out, wire size or type, inductance setting or other settings.

In accordance with the present invention, there is provided a control system for an electric arc welder performing a welding process between an electrode and a workpiece. In the preferred embodiment, the electrode is a welding wire fed into the arc at a wire feed speed controlled by a motor operating the wire feeding drive. The system comprises a high speed switching type power supply, such as an inverter or chopper. This power supply has a switching frequency of at least 10 kHz by a controller with an input current control signal to adjust the output current of the power supply. The controller operates more rapidly than the switching sequence of the power supply, but control is at the switching speed. A first sensor senses the actual arc voltage, while a second sensor senses the actual arc current. A first circuit is then provided for creating a power signal representing the desired real time power level at progressive times during the welding process. In the preferred embodiment, the power signal is created by a wave shaper that outputs a desired power profile. When spray or globular welding is being practiced, the power supply is a fixed value of the desired arc power. To complete the control system, there is a second circuit for generating a function of the sensed actual voltage and the sensed actual current to give a function of these two arc parameters for controlling the arc power. Consequently, a third circuit is used for adjusting the current control signal to the power supply in accordance with the difference between the desired power signal at any given time and the function of the actual voltage and current. This function is a feedback signal kP that is compared with the desired power signal at any given time during an arc condition so that the arc power is maintained at the desired level. This results in the equilibrium of the arc length as described previously. If the welding process involves a cycle that has a short circuit, then the power supply is operated in a current feedback mode during the short circuit condition. Thereafter, the system shifts to control by the feedback function or signal kP during the successive arcing conditions in the welding cycle. The function or feedback signal kP is preferably merely the product of voltage and current with k=1.0. However, it can employ a non-unity multiplier, as defined above, which multiplier may be a fixed number or a variable number according to the desired modulation of the power feedback function used in the control system. The feedback power signal is preferably $I_a \times V_a$. In the context of a power signal kP, k=1.0.

In accordance with another aspect of the invention, all circuits are digital circuits and performed by a digital signal processor, in accordance with standard welding control technology. However some aspects of the control system may be analog circuits or analog components without departing from the intended spirit and scope of the invention. The high speed switching type power supply is preferably an inverter operated at a frequency greater than 10 kHz and, preferably, substantially greater than 18 kHz. Of course, a chopper uses high speed switching and has a high speed inner control loop that can be controlled by power feedback signal kP. Preferably, the first digital circuit is a wave shaper that outputs a power profile matching the desired power level at all times during a welding cycle.

The invention is used with various welding processes. If the weld process has a fixed power, the invention does not require a wave shaper. Variable power cycles, such as pulse welding and AC welding, are controlled by the feedback signal kP and employ a device to output the desired arc power. When implementing a short circuit welding process, current control is used during the short circuit condition and feedback signal kP is used during the arc condition. In the present invention, the comparison of the actual arc power with the desired arc power is accomplished by a digital error amplifier having an output error signal that controls the pulse width modulator for adjusting the output current of the high switching speed power supply. Other implementations are within the skill of the art.

In accordance with another aspect of the invention, signal or function kP is used as a feedback signal to adjust the wire feed speed. In this manner, the arc length is changed to regulate the desired power of the arc by a change in wire feed speed (WFS). In accordance with still a further aspect of the present invention there is provided a method for controlling an electric arc welder by sensing the actual output current, sensing the actual output voltage, creating a power signal, creating a real time feedback signal kP representing the power at the arc, and then adjusting the input signal to the power supply by a comparison of the power signal and the real time arc signal kP. In this manner, as the voltage decreases the current increases and vice versa. This method can be practiced by a variety of analog and digital control circuits implemented in the high speed control loop of the welder.

In accordance with another aspect of the present invention power feedback signal P or kP is modified by a value representative of a parameter, such as wire feed speed or electrode travel speed.

The primary object of the present invention is provision of a system and method for controlling a high speed switching power supply of an electric arc welder in a manner to maintain a desired arc power by using a power feedback function or signal kP. As a broader object, there is creation of the feedback signal kP for controlling a weld parameter of an arc welding process.

Yet another object of the present invention is the provision of a system and method, as defined above, which system and method causes arc length stability and reduces current overshoots, especially when operating at low current and when welding aluminum.

Still a further object of the present invention is the provision of a system and method, as defined above, which system and method is easily implemented with standard welding technology without drastically modifying the control system of the electric arc welder.

These and other objects and advantages will become apparent from the following description taken together with the accompanying drawings

PREFERRED EMBODIMENTS

Figure 1:
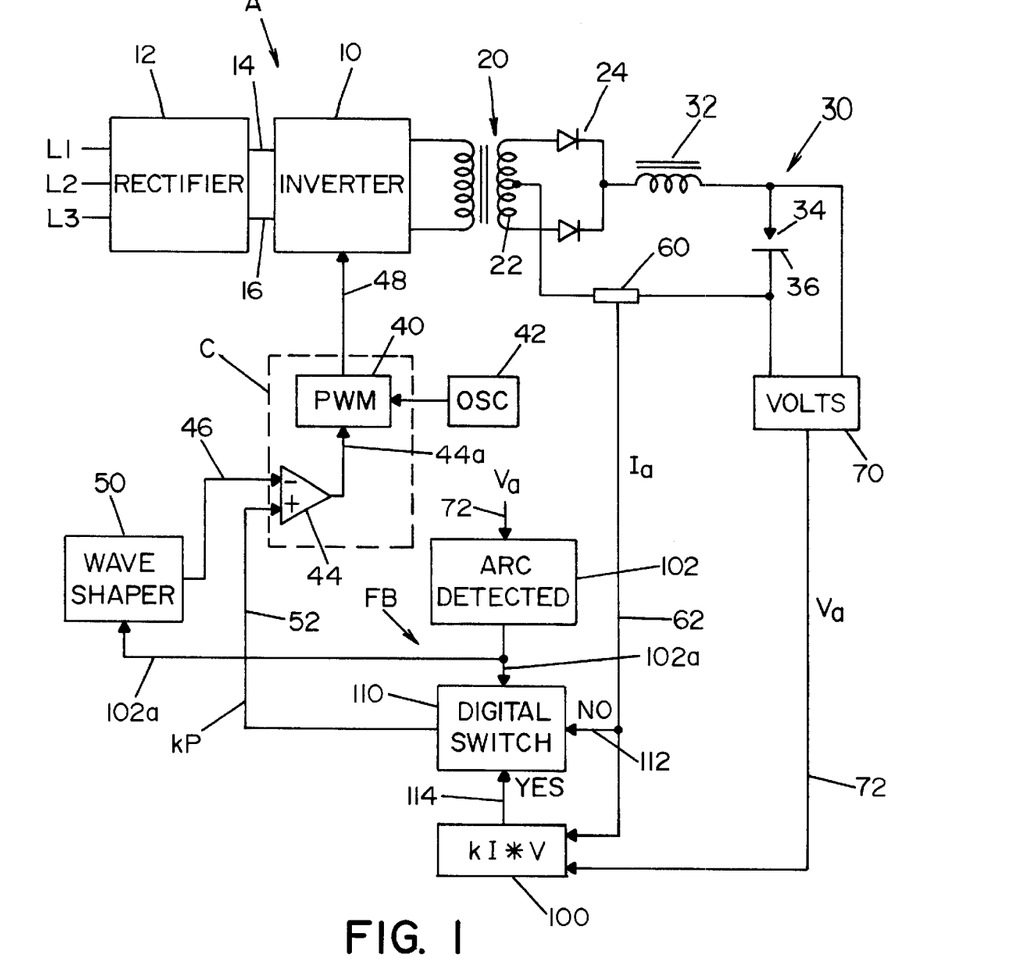
FIG. 1 is a combined block diagram and wiring diagram illustrating the preferred embodiment of the present invention.
Figure 10:
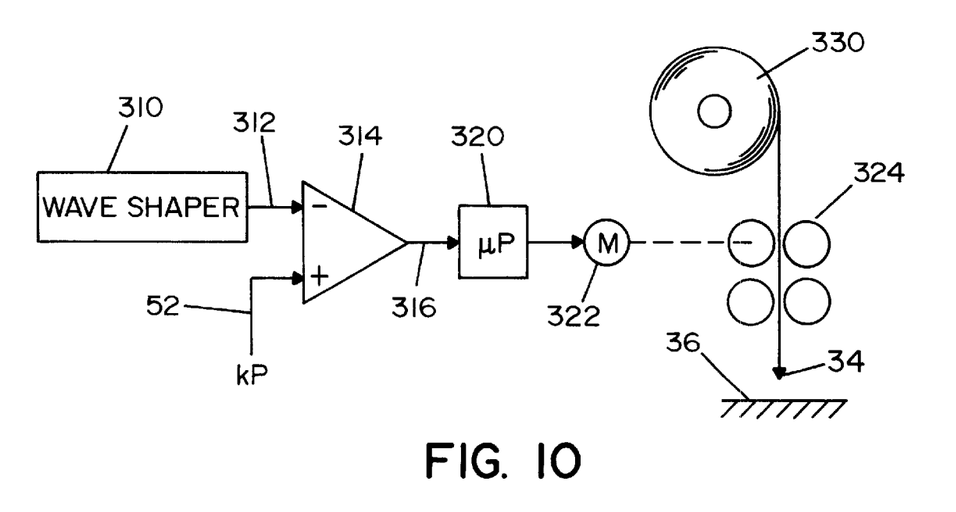
FIG. 10 is a diagram similar to FIG. 9 illustrating the use of the power feedback function or signal kP for controlling the wire feed speed.

Referring now to the drawings wherein the showings are for the purposes of illustrating preferred embodiments of the invention only, and not for the purpose of limiting same, FIG. 1 shows a welder A to perform a preselected welding process by using a high speed switching type power supply 10, illustrated as an inverter, but it could be a high speed switching chopper. In accordance with standard technology, the switching speed of the power supply is over 10 kHz, and preferably over 18 kHz. Inverter 10 is provided power from three phase rectifier 12 across a DC link in the form of input leads 14, 16. Output transformer 20 includes a center tapped secondary 22 driving output rectifier 24 for performing a welding process in output circuit 30 including an inductor 32 and an electrode 34 forming an arc gap with workpiece 36. In practice, electrode 34 is a forward advancing welding wire from a supply spool driven toward workpiece 36 during the performance of the welding operation. A wire feeder is schematically illustrated in FIG. 10. In accordance with standard technology, controller C is a digital processor device using a pulse width modulator 40 driven by an oscillator 42 at a high switching rate, generally above 10 kHz. A digital error amplifier 44 has a first input 46 with a voltage level or value determined from the output of wave shaper 50. The signal or level at input 46 is a power profile formed by wave shaper 50 during the arc condition of the welding cycle. In accordance with the invention, the arc power signal in input 46 is compared by error amplifier 44 with a feedback signal at input 52, so the error signal on line 44a adjusts the current command signal on line 48. Thus, the current command signal is 20 controlled by a relationship between the feedback function or signal kP on line 52 and the desired power level on line 46. In operation, the current signal on line 48 is adjusted by the relationship between inputs 46, 52 to instantaneously change the arc current. Power level on input 46 is created by digital wave shaper 50. In spray or globular welding the level on input 46 is constant. However, in other welding processes, such as pulse welding or AC welding, the power signal in line 46 is shifted to dictate the desired real time arc power. This operation is during arcing conditions of a weld cycle. Thus, the level on line 46 varies in real time during the welding cycle of the welding process. In accordance with the invention, the high speed control loop for welder 10 may be used to the exclusion of a slow outer control loop. This can be done because both current and voltage are used in the inner control loop, as illustrated in FIG. 1. The function or signal kP on feedback line 52 is obtained from feedback circuit FB. In accordance with the invention, the signal arc power P is expressed as a function of arc power kP. This function involves an instantaneous comparison of the arc voltage and the arc current with a desired power. To obtain arc current, shunt 60 creates a voltage signal in line 62. This signal $I_a$ is representative of the instantaneous arc current. In a like manner, instantaneous arc voltage $V_a$ is provided from sensor 70 on output line 72. Function generator 100 multiplies the values of the signals in lines 62 and 72 to produce a product which is the arc power P. In accordance with an aspect of the invention to be explained later, this arc power P is multiplied by a factor k which can be a constant, adjustable or a variable function. Thus, the power feedback signal is P or kP. When expressed as kP, arc power P is when k=1.0.

In welding processes there is often portions of the welding cycle where there is a short or no arc. At that time, there is no need to use the arc power from function generator 100. To determine the existence of an arc, many circuits are known. Such circuit is schematically illustrated as arc detector 102. The arc voltage on line 72 is compared with a threshold voltage so that a specific logic will appear at output 102a when the arc voltage increases to detect an arc. A low value on line 72 identifies a short circuit. Arc power feedback kP from function generator 100 need not be used during a short. The logic on line 102a controls digital two way switch 110 outputting the level on line 112 when there is no arc, i.e. a short. In that condition, the sensed arc current level on line 62 is directed through switch 110 to input 52 of error amplifier 44. Consequently, when there is no arc control C operates on the basis of a feedback of arc current $I_a$. A current command signal is used on line 46 during the short circuit portion of a welding operation with line 102a shifting wave shaper 50 to a current control mode. During the arc condition, function generator 110 provides a function or signal in line 114 that passes through switch 110 and then forms a function or signal kP on line 52. Signal kP is the arc power feedback signal. Arc power is provided in line 46 so that a comparison of the signal levels on lines 46 and 52 determines the current command signal at line 48. In practice, the factor k is 1.0. Thus, arc power kP is the function or signal in line 52 and the desired arc power during the arcing condition is outputted from wave shape 50 at input line 46. In accordance with the invention, the inner high speed control loop senses arc power kP, compares it with the desired power to produce immediate rapid high speed correction of the welding current.

Figure 1A:
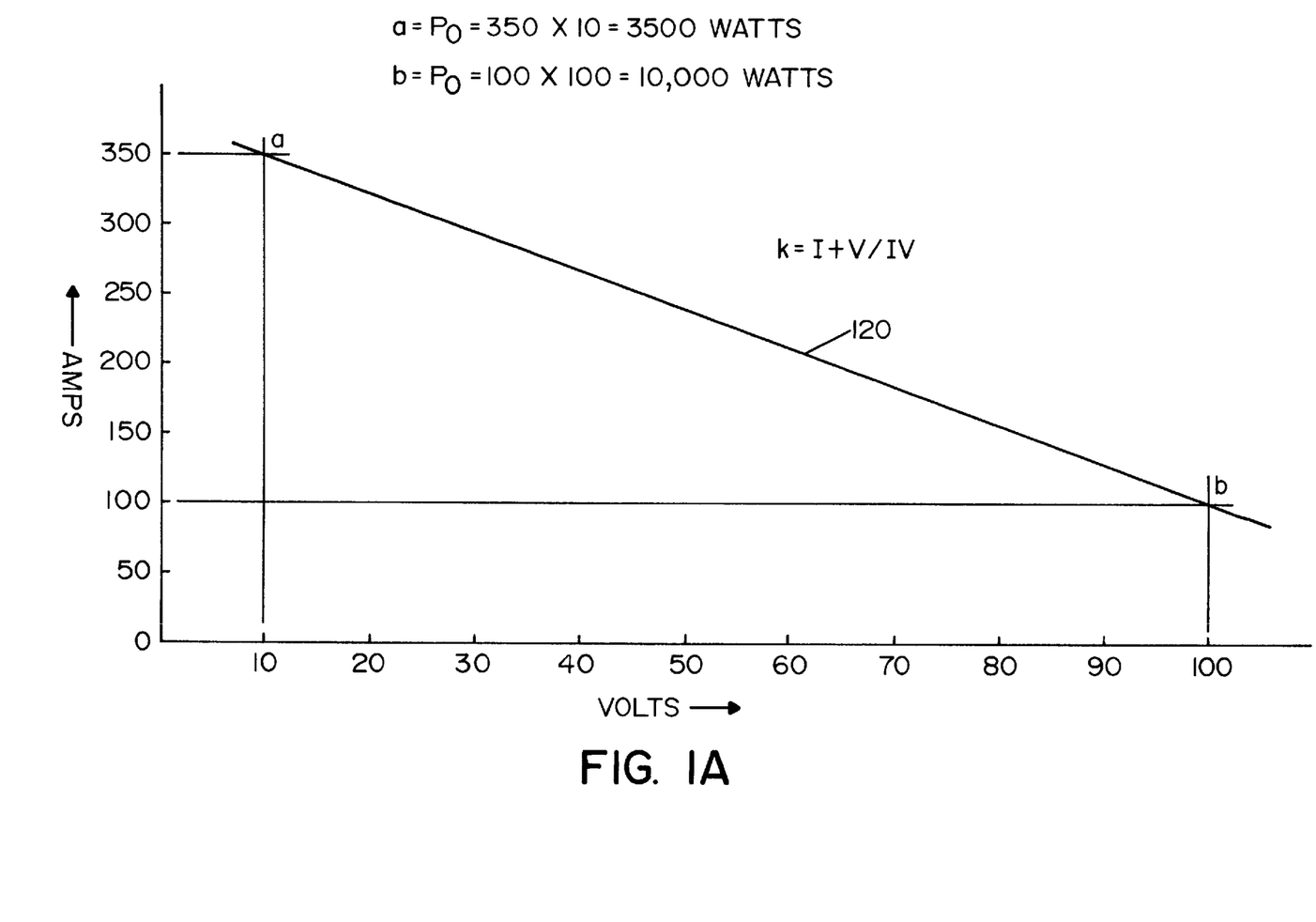
FIG. 1A is a voltage/current graph of the relationship of the feedback signal used when the factor k is adjusted to produce a straight line relationship between voltage and current.
Figure 1B:
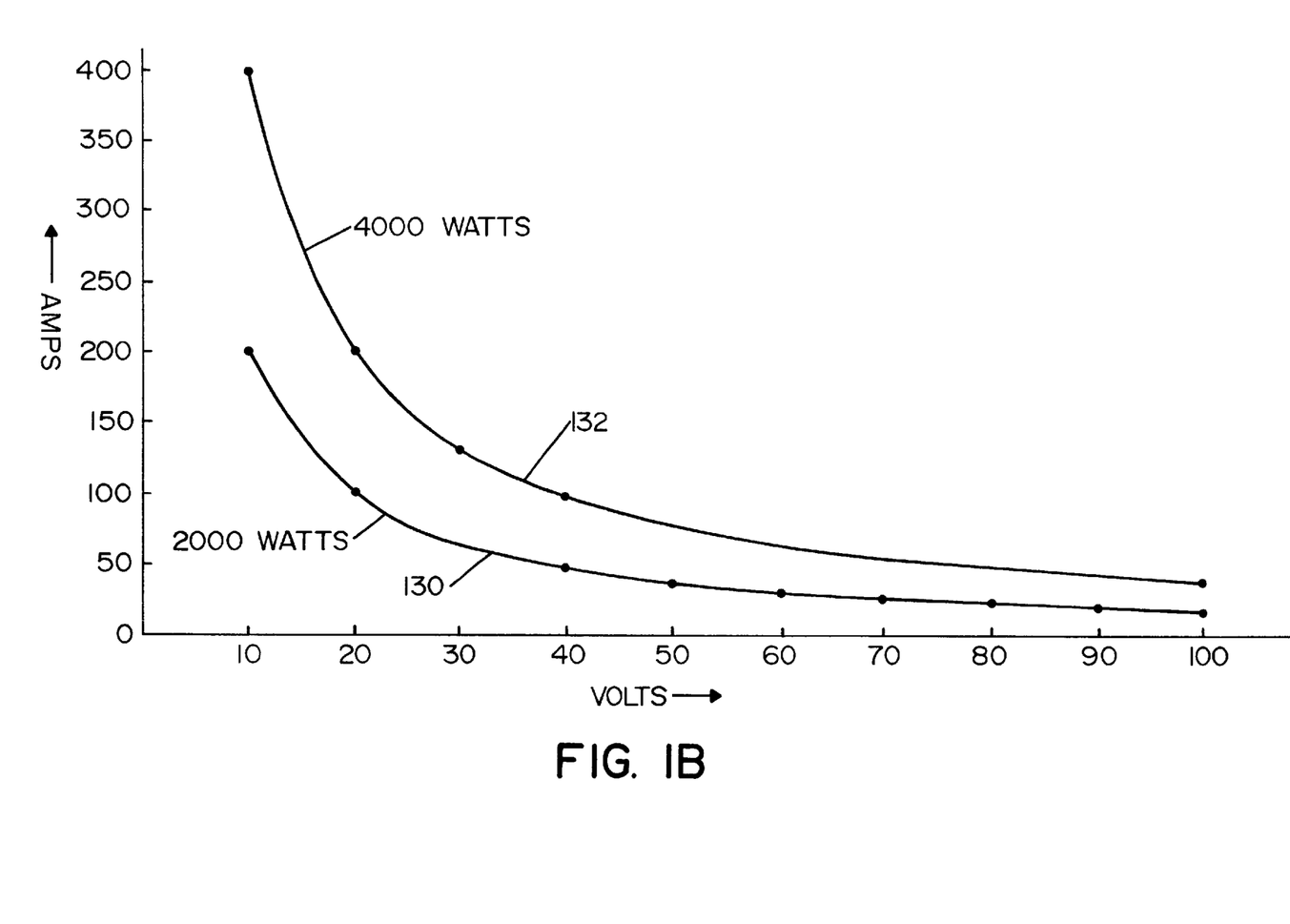
FIG. 1B is a graph similar to FIG. 1A where the factor k is 1.0, as in the preferred embodiment of the present invention.
Figure 2:
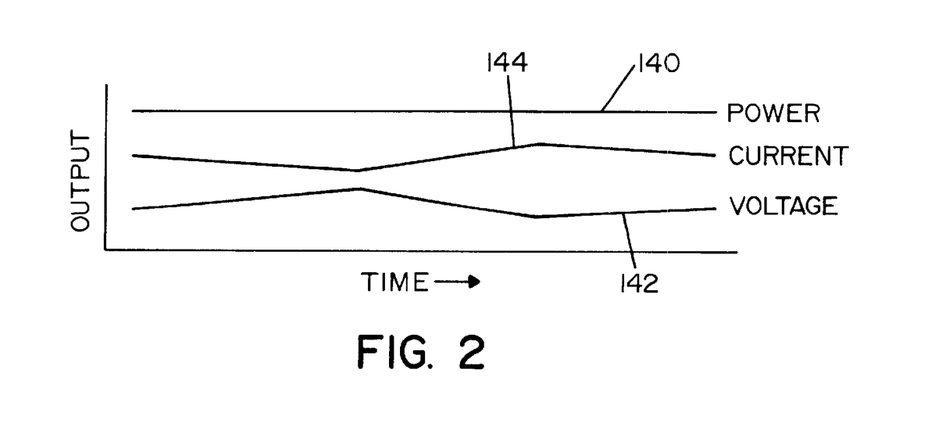
FIG. 2 is a graph of the present invention when the factor k is 1.0 and the welding process involves a constant arc power.

The relationship between the current and voltage is determined by the value of multiplier or factor k. In FIG. 1A, the factor k is equal to the current plus the voltage divided by the product of current and voltage. Consequently, the power signal in line 114 directed to input 52 is the voltage plus the current to give a slope as shown as curve 120 in FIG. 1A. This relationship is helpful when stick welding. In practice, multiplier k is 1.0 so that the signal in line 52 is arc power P obtained by multiplying the arc current and the arc voltage. FIG. 1B illustrates the relationship between arc current and arc voltage where the factor k is 1.0. The desired power is fixed at either 2,000 watts as illustrated by curve 130 or 4,000 watts as illustrated by curve 132. FIGS. 1A and 1B are representative to illustrate that the multiplier factor k can have a variety of values to control the relationship of current and voltage in the feedback network or system FB, as shown in FIG. 1. FIG. 2 illustrates the operation of the present invention with a constant power welding operation. This can be the constant peak power of a pulse in a pulse welding process or the constant background power in a short circuit welding operation. In this case, the feedback kP is compared to a desired level and factor k is 1.0. Indeed, it can be the desired fixed power in a spray or globular welding operation. During the time when the desired power on line 46 is maintained at the level shown in FIG. 2 each change in arc length modifies the arc voltage as shown by curve 142. Instantaneously, within the switching period of power supply 10, the current command signal on line 48 is adjusted to maintain the power of the arc at the set value of curve 140. The inner high speed control loop operates at the switching frequency. It is not a slow, adaptive type control loop of the prior art. Thus, when the arc length decreases, the voltage decreases and the current immediately increases. This causes a rapid increase in the arc force with an increase in the arc length. The feedback function or signal kP maintains the power at the level from wave shaper 50 on line 46. If the arc length increases, the voltage increases and the current immediately decreases to reduce the arc force and thus cause a decrease in the arc length. Consequently, the present invention uses the arc power feedback signal kP compared with the desired arc power to rapidly reach equilibrium and maintains a desired arc length. This is especially important during low current operations or when welding aluminum GMAW.

Figure 3:
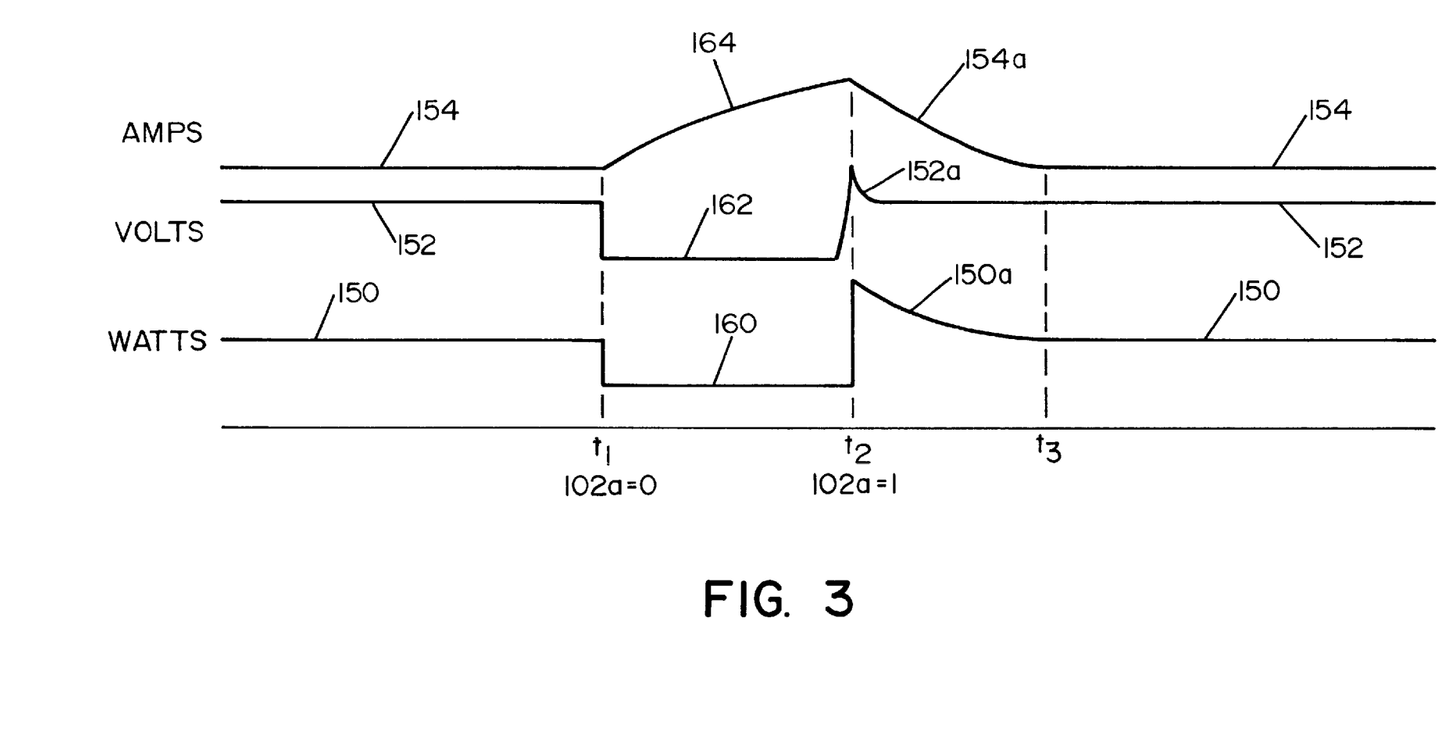
FIG. 3 is a graph with graphic representations of the arc condition for a short circuit welding process utilizing the present invention.

The operation of the invention for short circuit welding is illustrated in FIG. 3 wherein the power signal during the arc condition is shown as curve 150. This is the output of the wave shaper used to control the current illustrated in curve 154 according to the voltage as illustrated in curve 152. While an arc exists as detected by arc detector 102, switch 110 causes the function or signal on line 52 to be kP. At time $t_1$, there is a short circuit. The melted molten ball touches the workpiece causing arc detector 102 to shift switch 110 causing only current to appear in input 52. Wave shaper 50 is shifted to the current control mode by the logic on line 102a. Portion 160 of curve 150 illustrates a shift to a current control mode. The voltage is low as shown in curve portion 162. Current represented by curve 164 is controlled by the wave shaper and the current value on line 46. When the short breaks at time $t_2$, the signal on line 46 is again the desired power which transitions downwardly as shown in power curve portion 150a. Thus, the product of the voltage in transition portion 152a and current in transition portion 154a follow the desired power level. This rapid transition after the short is concluded by time $t_3$. The arc condition is again reestablished and welder 10 operates by comparing the actual arc power kP with the desired arc power of curve 150. This process is repeated during each short circuit cycle of the welding process. Other short circuit type welding processes can be performed by welder 10, such as STT short circuit welding.

Figure 4:
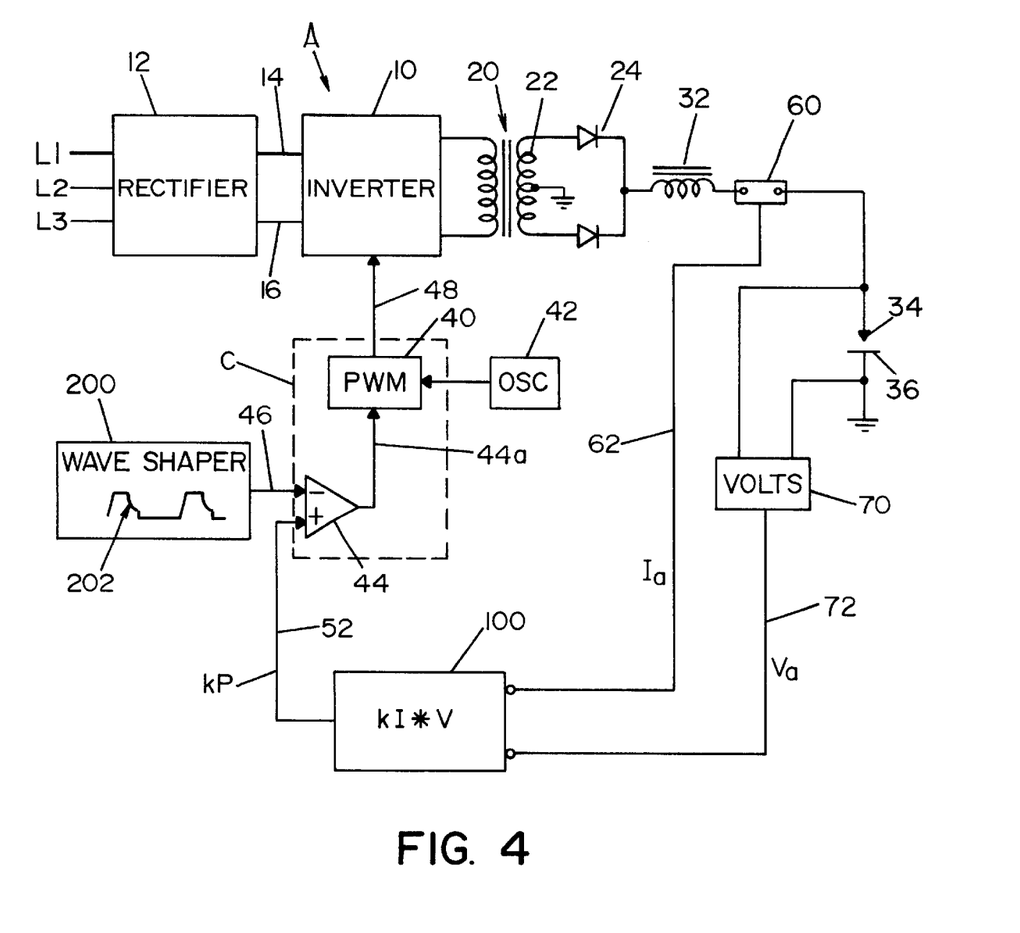
FIG. 4 is a combined block diagram and wiring diagram, similar to FIG. 1, of an embodiment for a pulse welding process.
Figure 5:
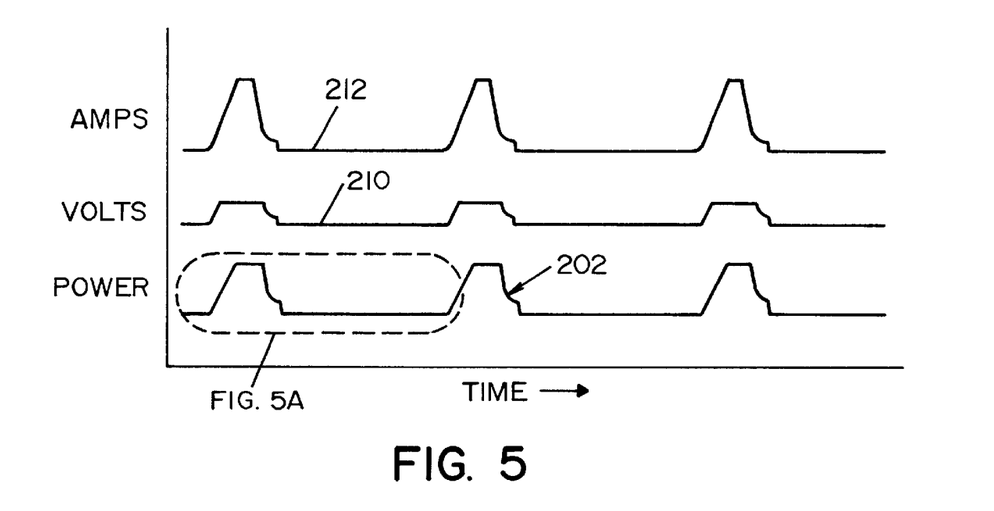
FIG. 5 is a graph similar to FIG. 2 showing the power profile and the arc voltage and current when using the embodiment of the invention illustrated in FIG. 4.
Figure 5A:
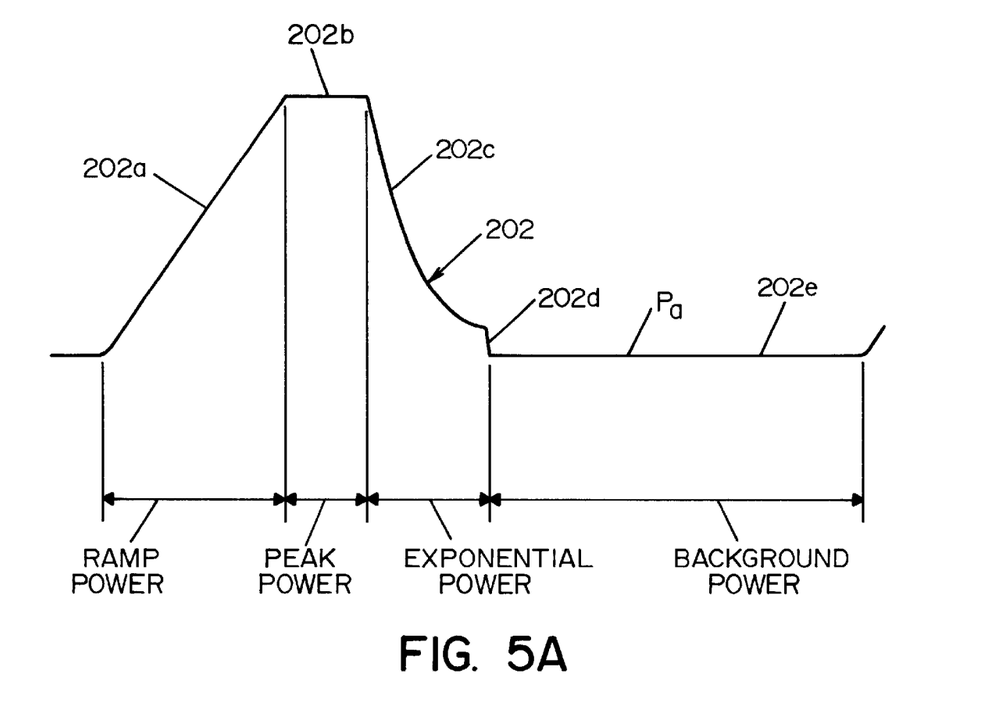
FIG. 5A is an enlarged portion of the power profile illustrated in FIG. 5.

Referring now to FIGS. 4, 5 and 5A, the use of the present invention for a pulse wave welding process is illustrated. Functionally equivalent components are numbered as in FIG. 1. When using the invention for pulse welding, wave shaper 200 creates power profile 202 corresponding to the desired power of the pulse welding cycle. Power profile 202 is shown in FIG. 5 and, in more detail, in FIG. 5A. To maintain the desired arc power profile 202, the voltage curve 210 and the current curve 212 are multiplied together by function generator 100 to follow the arc profile at input 46 of error amplifier 44. Power profile 202 shown in FIG. 5A includes a ramp portion 202a with a peak power portion 202b. Thereafter, the power profile exponentially decays along curve 202c until it reaches the desired target power at point 202d. Thereafter, the profile immediately shifts to the background power level 202e awaiting the next ramp 202a of the next pulse. In accordance with this aspect of the invention, power profile 202 controls the power of the arc during each portion of the pulse welding cycle. In practice, the ramp portion 202a and exponential portion 202c are sometimes controlled by voltage or current while the fixed power level of peak 202b and fixed power level of background 202e are controlled by comparing the feedback arc power function kP with the desired power from wave shaper 200. All portions of the pulse cycle are preferably controlled by a power profile. However, in a modification selected arc portions are controlled by power with the remaining portions controlled by current or voltage. In one implementation of the invention, the pulse compressing portion 202a, 202b, 202c is shifted on the fly to current control. Only the background portion 202e of the cycle is controlled by comparing the desired arc power with the actual arc power kP.

Figure 6:
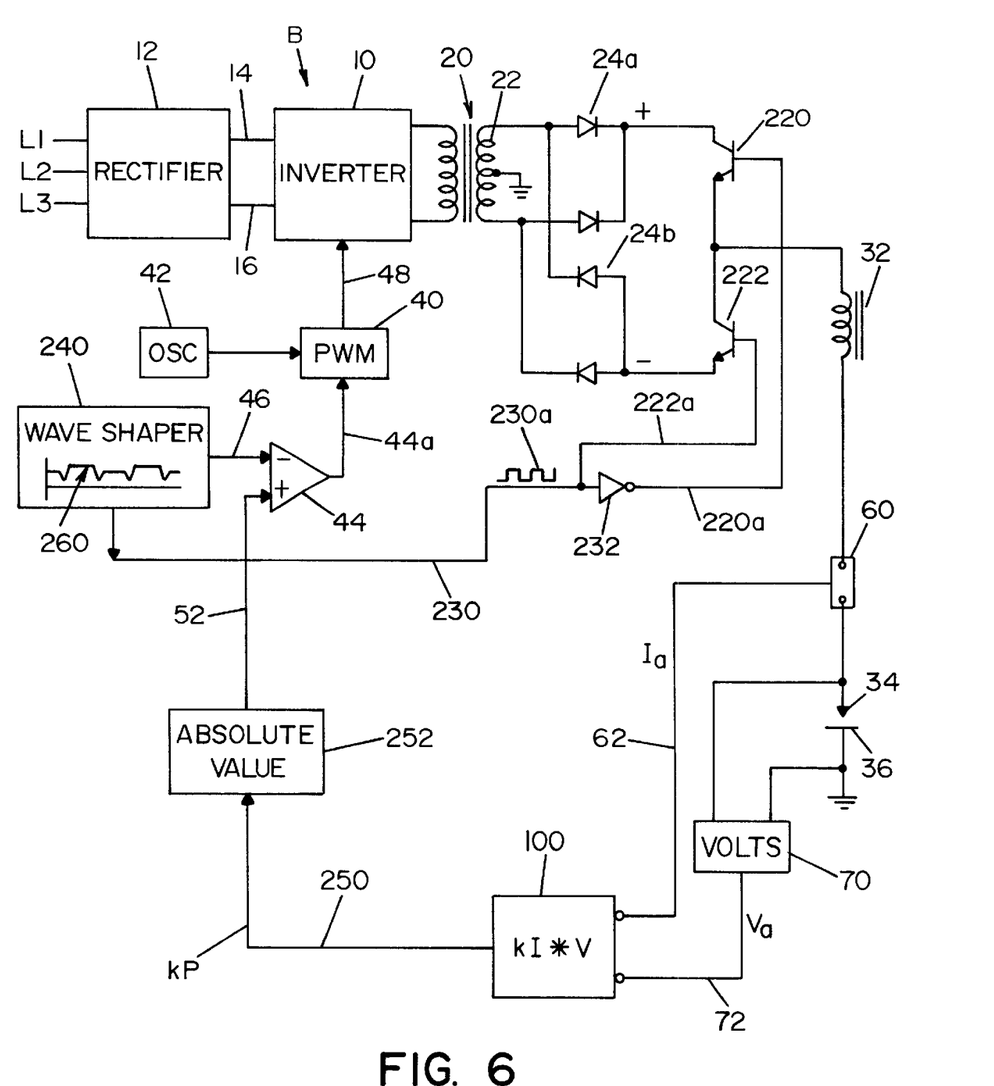
FIG. 6 is a combined block diagram and wiring diagram of the present invention, when used for AC welding.
Figure 7:
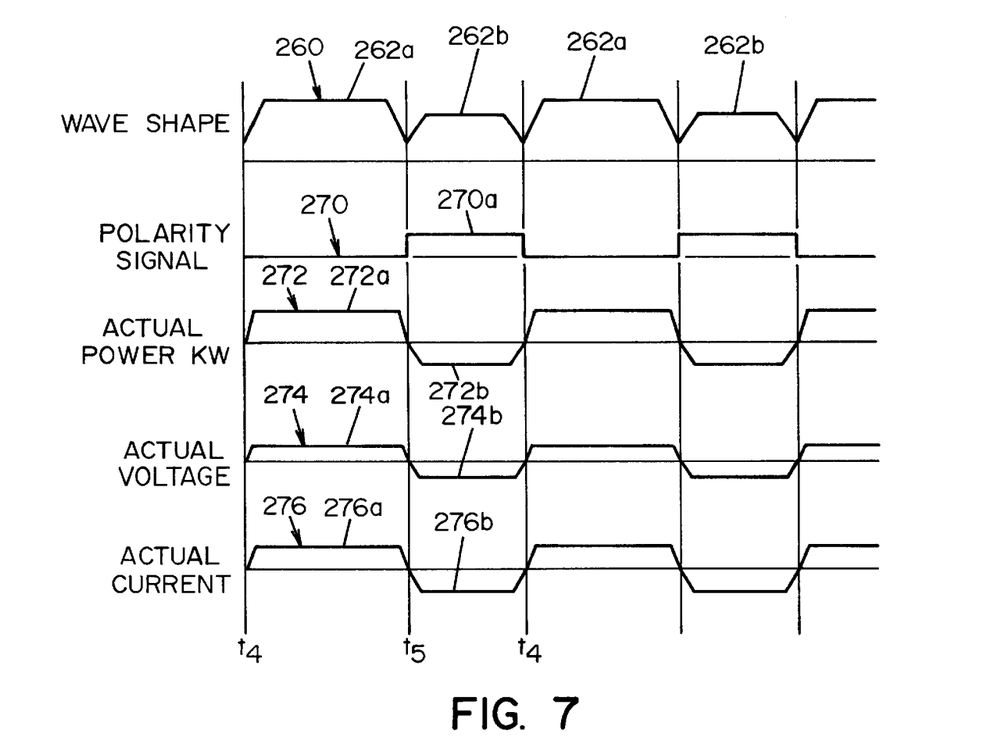
FIG. 7 is a graph with curve s created when implementing the embodiment of the invention shown in FIG. 6.
Figure 8:
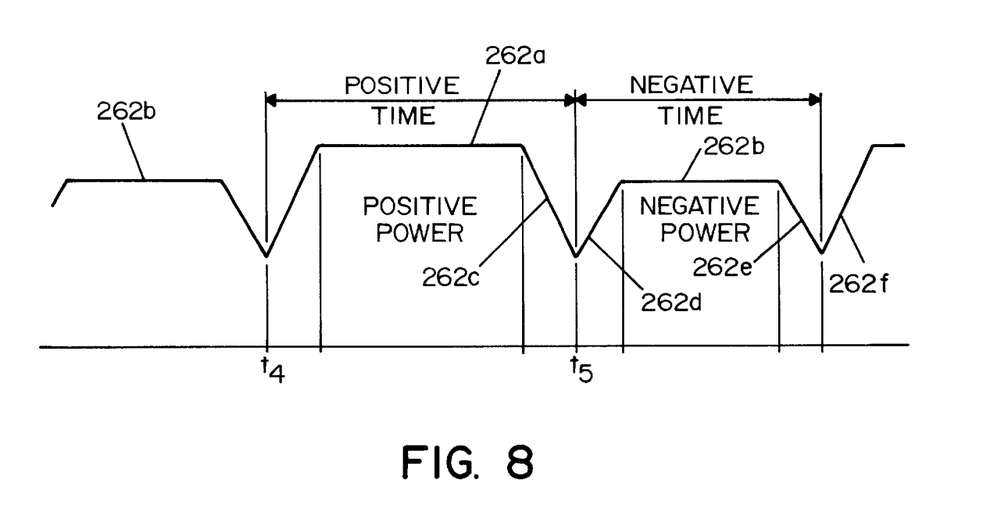
FIG. 8 is an enlarged portion of the wave shaper power profile shown in FIG. 7.

The present invention is used in most, if not all types of electric arc welding. An example of a welder B operated in an AC welding mode is illustrated in FIG. 6 with the operating curves shown in FIGS. 7 and 8. Electric arc welder B has the same basic architecture as shown in FIG. 1 and functionally equivalent components are numbered in the same manner. Output secondary 22 is used to drive a positive rectifier 24a and a negative rectifier 24b. Power is applied to the arc through polarity switches 220, 222 having energizing gates 220a, 222a, respectively. This is standard practice in AC welding, except the mode is expressed as power. A series of pulses on line 230 from wave shaper 240 alternately switch polarity switches 220, 222 at the frequency of the pulses 230a. Gate 232 is a non-coincident gate causing polarity switch 220 to operate at different times than polarity switch 222. In accordance with technology developed by The Lincoln Electric Company, switches 220, 222 are preferably switched when the welding current decays to a desired lower level, such as 100 amperes. This does not form a part of the present invention, but is technology used to prevent polarity reversals at high arc currents. Wave shaper 240 develops a power profile 260 which is outputted to input 46 of digital error amplifier 44. The error amplifier has an output 44a to drive pulse width modulator 40 in accordance with standard technology. The output of function generator 100 is the function, value or signal kP on line 250. In accordance with AC operation, the absolute value of the power on line 250 is used. This absolute value is obtained by conversion circuit 252. Thus, the power profile curve 260 shown in FIG. 7 is designed to have only positive values. To control the relative power during positive and negative pulses, the positive portion 262a of the power profile curve is greater than the power profile level 262b for the negative pulse. Also, the positive pulse is illustrated to be of longer duration than the negative pulse. The time between $t_4$ and $t_5$ is greater than the time between $t_5$ and $t_4$. The power level and timing are dictated by the power profile 260. This power profile is shown in more detail in FIG. 8 wherein the higher arc portion 262a transitions along line 262c to ramp down before switch polarities at time $t_5$. The level is decreased and then increased along the line 262d after switching. Thus, each polarity change involves a decrease in power and, after switching, the power is ramped up to the next power level. This aspect of the power profile causes a lower power at changes of polarity. Power profile 260 from wave shaper 240 coacts with the signal on line 230 which is illustrated as curve 270 having a series of pulses 270a for switching the polarity of the output current. In accordance with the invention, the actual power is shown in curve 272 with positive portions 272a and negative portions 272b. The actual current is curve 274 with positive portions 274a and negative portions 274b. In a like manner, the actual current is curve 276 with positive portions 276a and negative portions 276b. The polarity is changed between $t_4$ and $t_5$. Thus, the switching occurs at low power. FIGS. 6–8 illustrate the use of the present invention in an AC welding process for the purpose of showing the versatility and universal use of the present invention.

Figure 9:
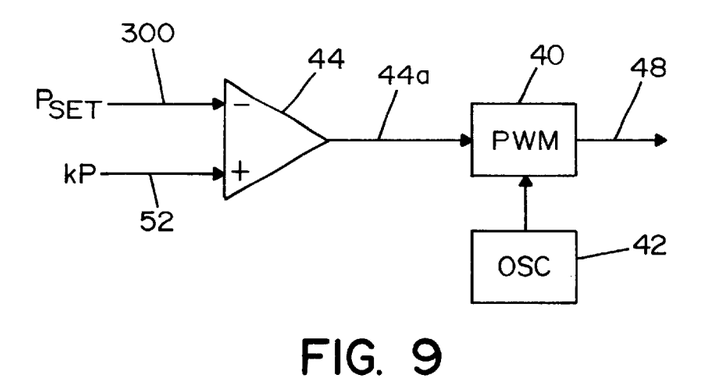
FIG. 9 is a partial block diagram and wiring diagram illustrating the use of the present invention with a fixed desired arc power.

As indicated before, the input to error amplifier 44 need not be the output of a wave shaper, as shown in FIG. 1, FIG. 4 and FIG. 6. Input 300 of error amplifier 44 in FIG. 9 has a value $P_{set}$ corresponding to a set desired power level. This power level is compared to the function or signal kP on line 52 by error amplifier 44 to produce an immediate change in the current command signal on line 48 with changes in the arc voltage. FIG. 9 illustrates the simplest version of the present invention wherein a set power level, which may be adjusted, is compared with the feedback function or signal kP from function generator 100 to control the inner control loop of a welder. A variation of the present invention wherein the function or signal kP is employed for feedback is illustrated in FIG. 10. The desired power from wave shaper 310 is applied at input 312 to error amplifier 314. The desired power is compared to the function or signal kP on line 52. Thus, output 316 from error amplifier 314 controls microprocessor 320 of the wire feeder. The signal on line 316 controls the speed of wire feed motor 322 driving the wire feeder 324 for forcing welding wire from spool 330 toward workpiece 36. By this use of the feedback function or signal kP, the wire feed speed increases when the voltage increases to decrease the arc length. When the voltage decreases, the wire feed speed is decreased to correct the arc length. This example illustrates the use of the function or signal kP for a feedback control of a welder parameter.

Figure 11:
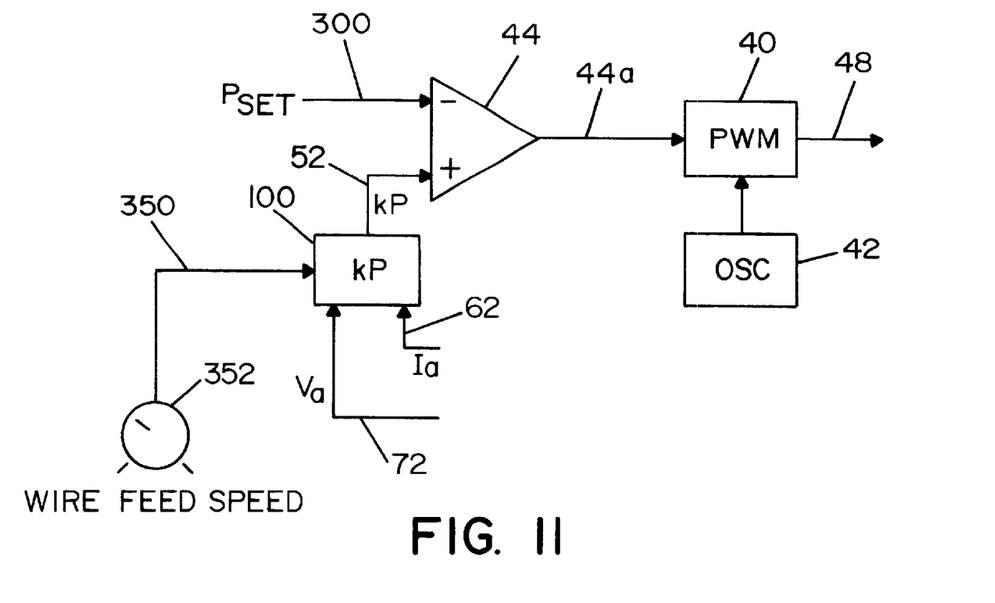
FIG. 11 is a partial block diagram and wiring diagram illustrating a modification of the invention wherein the feedback signal kP is monitored by wire feed speed.
Figure 12:
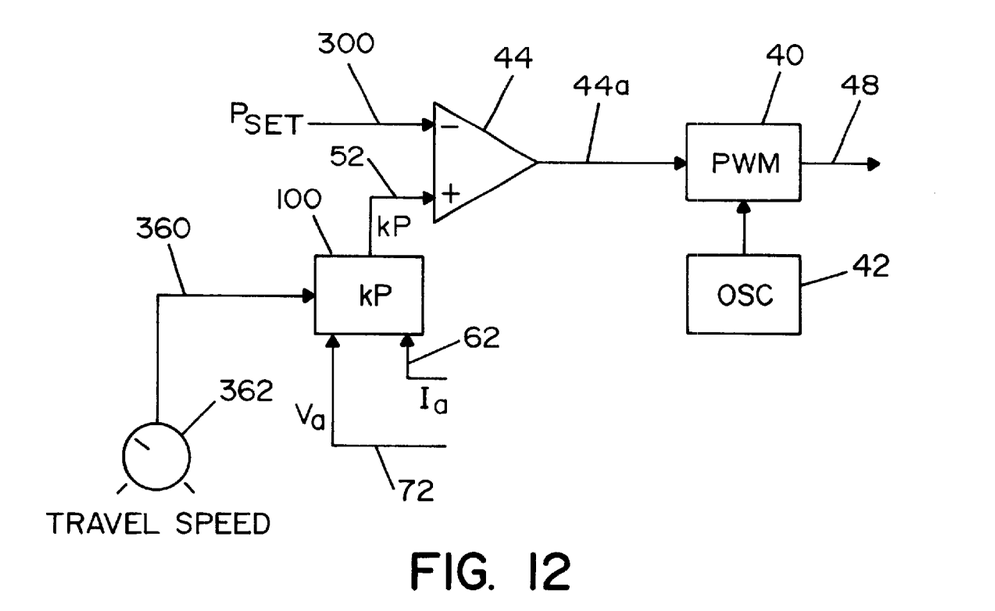
FIG. 12 is a partial block diagram and wiring diagram illustrating a modification of the invention wherein the feedback signal kP is monitored by travel speed; and, FIG. 13 is a combined block diagram and wiring diagram showing the present implementation of the invention.

Further uses of the feedback function or signals kP are illustrated in FIGS. 11 and 12. Each of these figures shows a set desired arc power 300, as discussed with respect to FIG. 9. Of course, the level on input 300 could be adjusted or could be the output of a wave shaper. To illustrate further use of the function or signal kP, FIG. 11 discloses function generator 100 where function kP is modified by a signal on line 350 from a wire feed speed knob 352. The circuit is used with welder A or welder B, or versions thereof. In this use of the novel feedback function or signal kP, the function is varied or modified by the setting of knob 352 used to adjust the wire feed speed. In FIG. 12, the signal on line 360 from the electrode travel speed knob 362 modifies the signal kP. Thus, the feedback signal kP is modified by a signal indicative of the travel speed setting of the welding operation. Of course, other modifications of the feedback signal or function kP are used to control the welding operation by a modifying of the function or signal kP.

Figure 13:
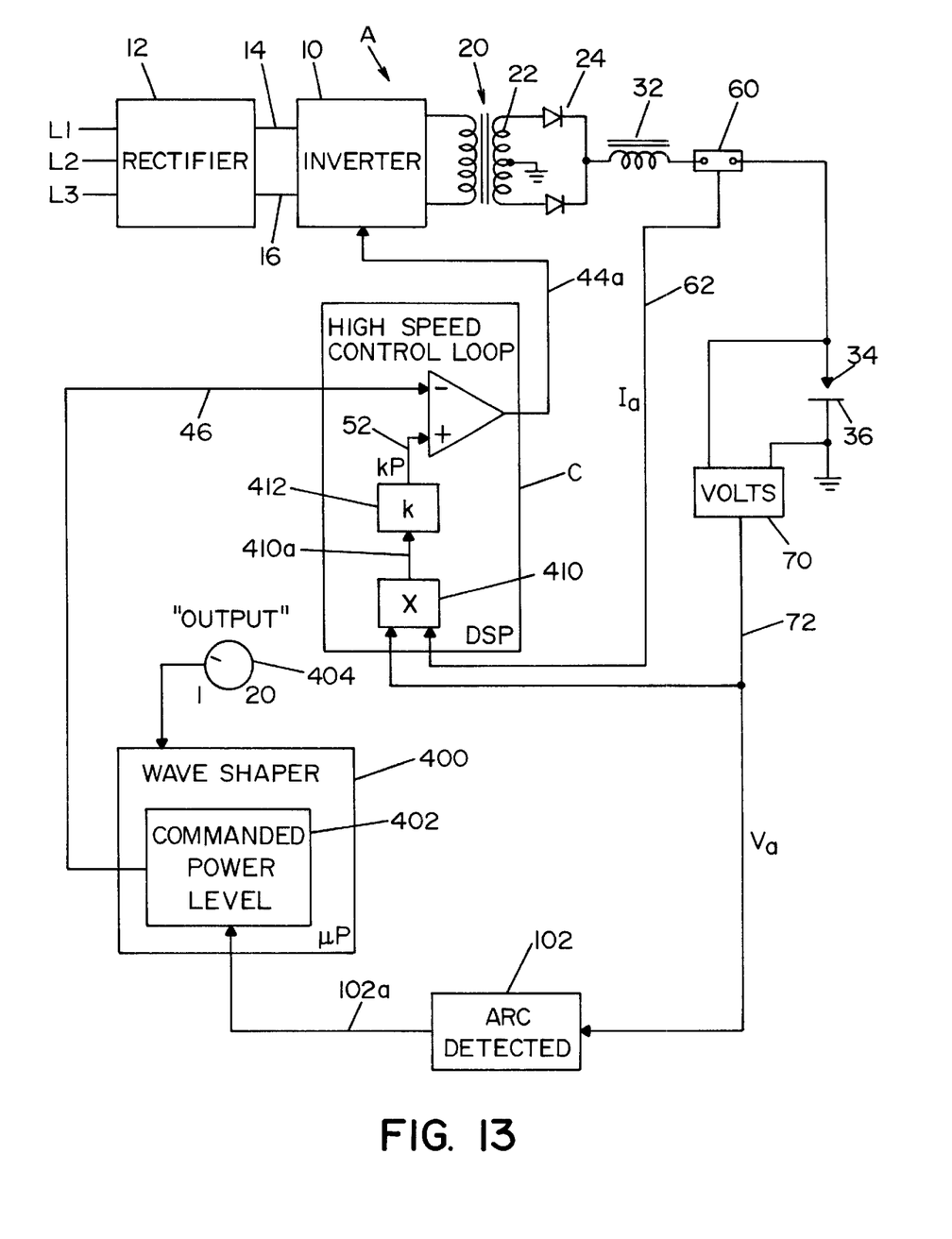

Turning now to FIG. 13, the present implementation of the invention is illustrated. Welder A has components set forth in FIG. 1 and are labeled with the same numbers. Arc detector 102 controls the logic in line 102a so the command power level or power profile 402 is outputted by wave shaper 400 only while there is an arc between electrode 34 and workpiece 36. Arc current and arc voltage are directed to controller C and are multiplied as indicated by circuit 410 of the digital signal processor C. The output 410a is multiplied by factor k to provide the feedback function or signal kP on line 52. This is the feedback power signal which, in practice, involves a factor k equal to 1.0. Thus, a signal indicative of actual arc current appears on line 52. This is compared to the desired arc power on line 46 to control the current instantaneously with changes in arc voltage. Consequently, the arc power is maintained constant or at a desired level with equilibrium of arc length. Other implementations of the present invention using the feedback signal or function kP are apparent to persons with skill in the electric arc welding field.

In this description the use of lines and analog components is for explanation of the invention; however, in practice, these lines and components are digital values and software programs or a combination analog and digital items. The feedback of arc values is digitized by analog to digital converters. All of these designs are known in the welding art. The wave shaper is digital and housed in a microprocessor in the practical implementation of the invention.

Having thus defined the invention, the following is claimed:

1. A control system for an electric arc welder performing a welding process between an electrode and a workpiece, said process including at least time during which there is an arc condition, said system comprising: a high speed switching type power supply with a controller operated at a switching frequency of at least about 10 kHz and having an input current control signal to adjust the output current of said power supply; a first sensor sensing the actual arc voltage; a second sensor sensing the actual arc current; a first circuit for creating a power profile signal representing desired real time power levels at progressive times during said arc condition of said welding process; a second circuit for creating a function of the sensed actual voltage and the sensed actual current on a real time basis; and a third circuit for adjusting said current control signal in accordance with the difference between said power profile signal and said function of the actual voltage and current on a real time basis.

2. The system as defined in claim 1 wherein said function is the product of said actual voltage and actual current.

3. The system as defined in claim 2 wherein said function includes a multiplier.

4. The system as defined in claim 2 wherein said function includes a multiplier and is a constant.

5. The system as defined in claim 4 wherein said constant is 1.0.

6. The system as defined in claim 2 wherein said function includes a multiplier defining a slope.

7. The system as defined in claim 6 wherein said multiplier is the sum of the current and voltage divided by the product of the current and voltage.

8. The system as defined in claim 2 wherein said first circuit is a wave shaper.

9. The system as defined in claim 1 wherein said high speed switching type power supply is an inverter.

10. The system as defined in claim 9 wherein said first circuit is a wave shaper.

11. The system as defined in claim 1 wherein said first circuit is a wave shaper.

12. The system as defined in claim 11 wherein said wave shaper is a digital processing device.

13. The system defined in claim 11 wherein said welding process is a pulse welding method.

14. The system defined in claim 1 wherein said third circuit is error amplifier.

15. The system as defined in claim 1 including a pulse width modulator for adjusting the output of said power supply according to said input current control signal.

16. A control system for an electric arc welder performing a welding process between an electrode and a workpiece, said system comprising: a high speed switching type power supply with a controller operated at a switching frequency greater than about 18 kHz and having an input current control signal to adjust the output current of said power supply; a first sensor sensing the actual arc voltage; a second sensor sensing the actual arc current; a first circuit for creating a power signal representing the desired real time power level determined at progressive times during the welding process with said times being correlated with said switching frequency; a second circuit for creating a function of the sensed actual voltage and the sensed actual current; and a third circuit for adjusting said current control signal in accordance with the difference between said power signal and said function of the actual voltage and current and where said function is the product of said actual voltage and actual current.

17. The system as defined in claim 16 wherein said high speed switching type power supply is an inverter.

18. The system as defined in claim 17 wherein said first circuit is a wave shaper.

19. The system as defined in claim 18 wherein said wave shaper is a digital processing device.

20. The system as defined in claim 16 wherein said first circuit is a wave shaper.

21. The system as defined in claim 16 wherein said times generally are the same as said switching frequency.

22. A control system for an electric arc welder performing a welding process involving an arc between an electrode and a workpiece for only a portion of said process, said system comprising: a high speed switching type power supply with an output current controlled by the value of an input signal; a sensor for sensing the actual output current during said arc portion; a sensor for sensing the actual output voltage during said arc portion; a first circuit for creating a power signal for said arc portion; a second circuit for creating a real time signal representing the power of said arc during said arc portion; and a third circuit for adjusting said input signal during said arc portion by a comparison of said power signal and said real time arc signal.

23. The system defined in claim 22 including a circuit for generating a current signal whenever the process is not in said arc portion and circuit for adjusting said input signal when said process is not in said arc portion by a comparison of said current signal and said actual output current.

24. A control system for an electric arc welder performing a welding process involving an arc between an advancing welding wire and a workpiece, said system comprising: a motor for controlling the wire feed speed controlled by the value of an input signal; a sensor for sensing the actual output current; a sensor for sensing the actual output voltage; a first circuit for creating an instantaneous power signal for said welding process as it progresses; a second circuit for creating a real time signal representing the power of said arc at a given instant during said process; and a third circuit for adjusting said input signal by a comparison of said instantaneous power signal and said real time arc signal.

25. A method for controlling an electric arc welder performing a welding process between an electrode and a workpiece, by a high speed switching type power supply operated at a switching frequency of at least about 10 kHz by a controller with an input current control signal to adjust the output current of said power supply, said process including at least times during which there is an arc condition and times when there is a non-arc condition, said method comprising:

(a) sensing the actual instantaneous arc voltage, (b) sensing the actual instantaneous arc current;

(c) creating a power profile signal representing the desired real time power level at progressive times during said arc condition of said welding process;

(d) creating a function of the sensed actual instantaneous voltage and the sensed actual instantaneous current on a real time basis; and, (e) adjusting said current control signal in accordance with the difference between said power signal and said function of the actual voltage and current on a real time basis.

26. The method as defined in claim 25 wherein said function is the product of said actual voltage and actual current.

* * * * *